United States Patent [19]

Perfect

[11] Patent Number: 4,863,545
[45] Date of Patent: Sep. 5, 1989

[54] METHOD OF PERMANENTLY ATTACHING A FLEXIBLE PLASTIC TO A RIGID PLASTIC

[75] Inventor: Alan J. Perfect, Chesterfield, N.J.
[73] Assignee: Shelcore, Inc., South Plainfield, N.J.
[21] Appl. No.: 192,335
[22] Filed: May 10, 1988
[51] Int. Cl.$^4$ ............................................. B32B 31/06
[52] U.S. Cl. ..................... 156/294; 156/91; 248/205.5
[58] Field of Search .............. 156/91, 92, 293, 294, 156/303.1; 248/205.4, 205.5, 205.6, 205.7, 205.8, 205.9, 206.1, 206.2, 206.3, 206.4, 362, 363, 309.3; 269/21; 138/109

[56] References Cited

U.S. PATENT DOCUMENTS

| | | | |
|---|---|---|---|
| 2,024,429 | 12/1935 | Casey | 248/205.5 |
| 2,319,727 | 5/1943 | Duggan | 248/205.9 |
| 2,900,757 | 8/1959 | Grimm | 248/309.3 |
| 3,338,293 | 8/1967 | Hohmann | 248/205.5 |
| 3,565,117 | 2/1971 | Schmunk | 138/109 |
| 3,655,193 | 4/1972 | Jones | 248/363 X |
| 3,736,668 | 5/1973 | Dillarstone | 248/205.5 |
| 3,863,568 | 2/1975 | Frederick | 248/205.8 |
| 4,660,867 | 4/1987 | Kemper et al. | 156/294 X |

*Primary Examiner*—Michael W. Ball
*Assistant Examiner*—Steven D. Maki
*Attorney, Agent, or Firm*—Michael J. Weins

[57] ABSTRACT

The present invention relates to a method of attaching a flexible plastic component to a rigid plastic component. The present technique can be used for such purposes as retrofitting suction cups to rigid plastic hollow legs such as may be provided to a children's bathtub seat. The flexible plastic component is attached to the rigid plastic component by use of the following procedure: (a) a passage is provided in the rigid component; (b) an extension is contoured to slidably engage the passage in the rigid plastic; (c) the extension is provided with one or more indentations; (d) the rigid plastic inserts are contoured to fit the indentation in the extensions; (e) the inserts are placed in the indentations; (f) the rigid plastic inserts are wet with a bonding liquid; (g) and finally the extension is inserted into the passage in the rigid plastic.

15 Claims, 2 Drawing Sheets

METHOD OF PERMANENTLY ATTACHING A FLEXIBLE PLASTIC TO A RIGID PLASTIC

FIELD OF THE INVENTION

The present invention relates to a method of attaching rigid plastic components to flexible plastic components. Using the method of the present invention a flexible plastic component, such as suction cups, can be retrofit to rigid plastic tubes.

BACKGROUND OF INVENTION

Currently flexible plastic components are attached to rigid plastic by use of an adhesive, by friction fitting and/or by mechanical locking means. The current method for adhesive bonding, where a flexible plastic component is adhesively bonded to a rigid plastic, has the disadvantage that when the flexible plastic is stretched or compressed a shear stress develops between the rigid plastic and the flexible plastic component. This shear stress causes a gradual shearing of the adhesive at the interface between the rigid plastic and the flexible plastic component.

Friction fit, and/or the mechanical lock means can loosen from the strains resulting from the stretches and/or compression of the flexible plastic component.

Thus there is a need for a new method of permanently affixing a flexible plastic component to a rigid plastic component that reduces the likelihood of the flexible component becoming separated from the rigid plastic component.

The present invention relates to a method of attaching a flexible plastic. Flexible plastic as considered for this application, will include flexible plastics and either rubbers or artificial elastomers. Rigid plastics are thermoplastics and thermosetting plastics. The present technique can be used for such purposes as retrofitting suction cups into rigid plastic tubes such as the legs on children's bathtube seats.

A flexible plastic component is attached to a rigid plastic component in accordance with the present invention by adherence to the following procedure: (a) a passage is provided in the ridig plactic component; (b) an extension is provided to the flexible plastic component; (c) the extension is contoured to slidably engage the passage in the rigid plastic; (d) the extension is provided with one or more indentations; (e) and rigid plastic inserts are contoured to fit the indentations so that when the inserts are positioned in the indentations the extension, in combination with the inserts, will slidably engage the passage provided in the rigid plastic. When affixing the flexible plastic to the rigid plastic the inserts are placed into the indentations; the inserts are wet with a bonding liquid; the extension in combination with the inserts is engaged into the passage and the extension maintained in the position for a time sufficient to allow the inserts to bond to the passage. The bonding liquid can be an adhesive or a solvent.

It is preferred that the rigid plastic inserts have the same composition as the rigid plastic and that the bonding liquid be a solvent which will soften the rigid plastic inset and the material on the inside surface of the passage in the proximity of the inserted insert. In this manner the insert will be permanently bonded to the rigid plastic passage.

In a preferred embodiment the passages and the associated extensions have volumes generated by displacing a line parallel to and about an axis. The surface of the volume is then provided with indentations which preferably are channels substantially normal to the axis of generation.

In one particular embodiment of the extension is a cylinder with a circular channel having its center on the axis of generation.

It is further preferred that the plastic inserts art provided with recession in which fluid such as the bonding liquid, and any gas that may be entrapped and compressed in the tube can flow. These recesses are preferably between about 0.001 inch and 0.010 inch. The recesses should be so disposed as to enhance the wetting of the inside surface of the rigid plastic passage by the bonding liquid.

In another preferred embodiment the inserts have beveled edges and the inserts, when placed into the channels form a press fit with the passage and provide pressure between the inserts and the passage while the bonding liquid is developing a bond between the passage and the inserts.

In another preferred embodiment means are provided for retaining the inserts in the channel. These means can be either a friction fit between the channel and the inserts or, alternatively, pins and pin receivers can be used.

The channel geometry is preferable such that the depth of the channel is approximately 0.25 times the diameter of the protrusion. Furthermore it is preferred that the depth of the protrusion is no greater that the distance between the channel and the end of the protrusion.

BEST MODE FOR CARRYING THE INVENTION INTO PRACTICE

Rigid plastic components and flexible plastic components are frequently formed by injection molding or compression molding and then assembled to fabricate the product.

Figure 1:
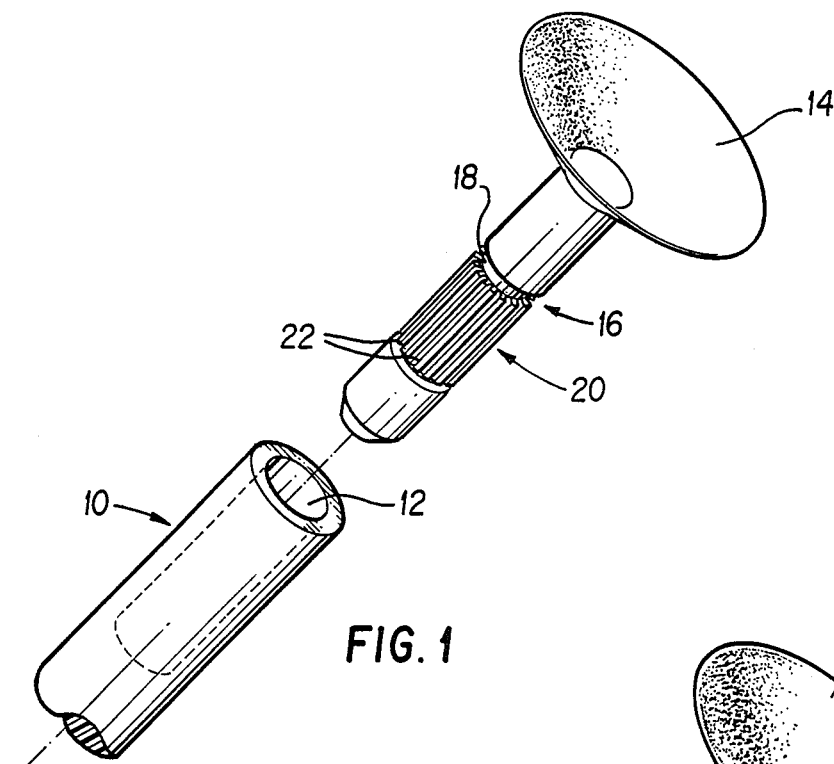
FIG. 1 shows a flexible suction cup having an extension thereon. The extension being configured to slidably engage a passage within a ridged plastic tube.

FIG. 1 is and exploded view of an assembly joining a rigid plastic leg and a flexible plastic suction cup. FIG. 1. shows a plastic leg 10 made of a rigid plastic. The plastic leg 10 has a passage 12. A suction cup 14 is provided with an extension 16. The extension 16 is contoured to slidably engage the passage 12 of the plastic leg 10. The extension 16 has a channel 18 contoured to accommodate inserts 20. The inserts 20 preferably have the same composition as the rigid plastic leg 10. The inserts 20 are provided with recesses 22. The recesses 22 reduce the friction between the inserts 10 and the passage 12 during assembly. The recesses 22 also provide for retention of the glue or solvent. The recesses 22 also allow gasses to escape. The depth of the recesses is preferably between about 0.001 inch and 0.010 inch. The depth will assure sufficient reaction of glue or solvent and allow passage of gas entrapped in the passage 12.

To assemble the leg 10 and suction cup 14 shown in FIG. 1, the extension 16 is fitted with the inserts 20 which are placed in the channels 22. The extension 16 with the insert 20 in place is dipped into a bond agent which may be a glue or preferably a solvent, and extension 16 with the inserts 20 is pressed into the passage 12.

It is preferred that the bonding agent is a solvent and the leg 10 and the inserts 20 have the same composition. The solvent has chosen to soften the plastic and causes welding of the inserts 20 to the leg 10. In this way the leg 10 with the inserts 20 become of unity and the plastic suction cup is retained in the leg during subsequent use.

While the extension 16 is illustrated as a cylindrical extension other configurations can be employed. The limitation on the geometry of the extension 16 is that the extension 16 must be such that it can slidably engage the passage 12.

Figure 2:
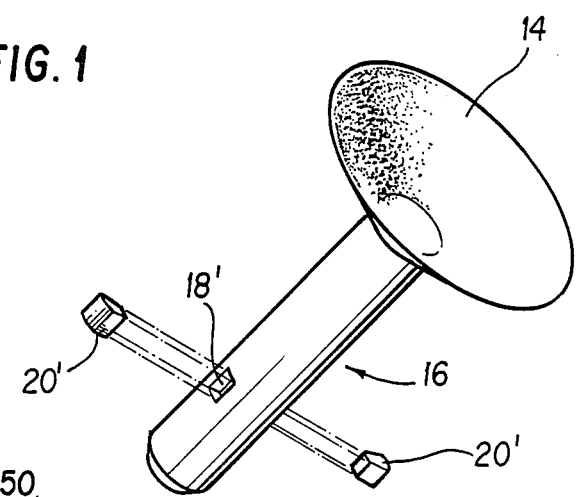
FIG. 2 shows a suction cup having an extension thereon. The extension having recesses which engage inserts.

FIG. 2 shows a suction cup extension 16. Indentations 18' which are rectangular in cross section are employed to engage rectangular insert 20'. The rectangular inserts 20' are slightly larger in cross section than the cross section indentation 18' so as to form a friction fit.

Figure 3:
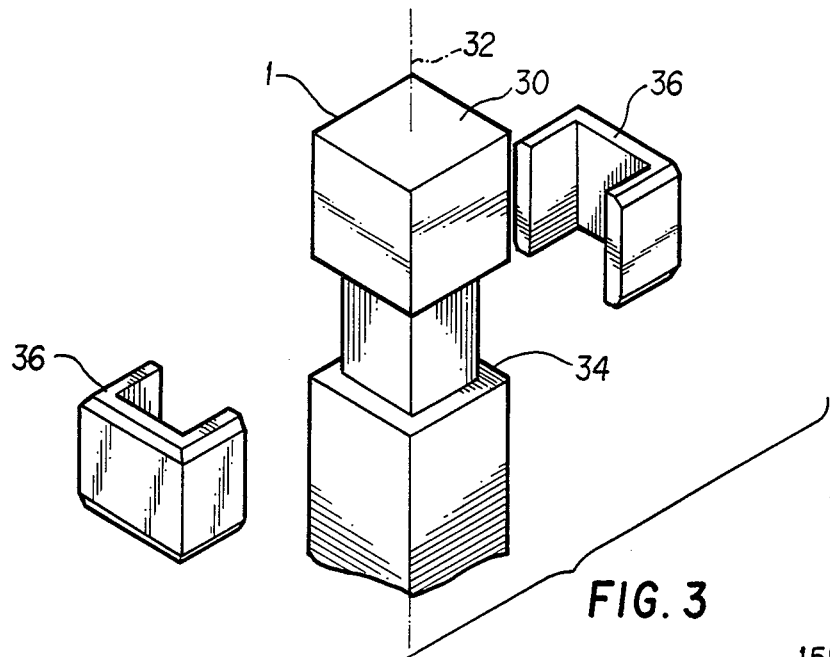
FIG. 3 shows one configuration of an extension. The extension has a rectangular cross section.

FIG. 3. illustrates a second extension geometry. The extension 30 is generated by moving a line 1 about an axis 32 and tracing out a square as shown. A rectangular channel 34 normal to the axis 32 is provided contoured inserts 36 and are placed in the channel. To facilitate assembly it is preferred that the inserts 36 are provided with a means for retaining the inserts 36 in the channel 32. This can be accomplished by having a frictional fit between a channel 34 and the inserts 36. Alternatively the extensions can be retained in the channel by means which lock the inserts 36 together.

Figure 4:
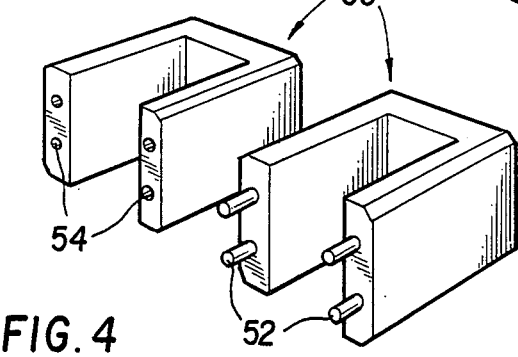
FIG. 4 shows a pair of rigid plastic inserts suitable for use in the channel in the extension of FIG. 3. The rigid plastic inserts have pins to provide retention of the plastic inserts when placed in the channel.

FIG. 4. shows one such locking means wherein the inserts 50 are provided with pins 52 and pin accepters 54 so that when the inserts 50 are positioned the pins 52 engage the pin accepters 54 to create a pressed fit.

Figure 5:
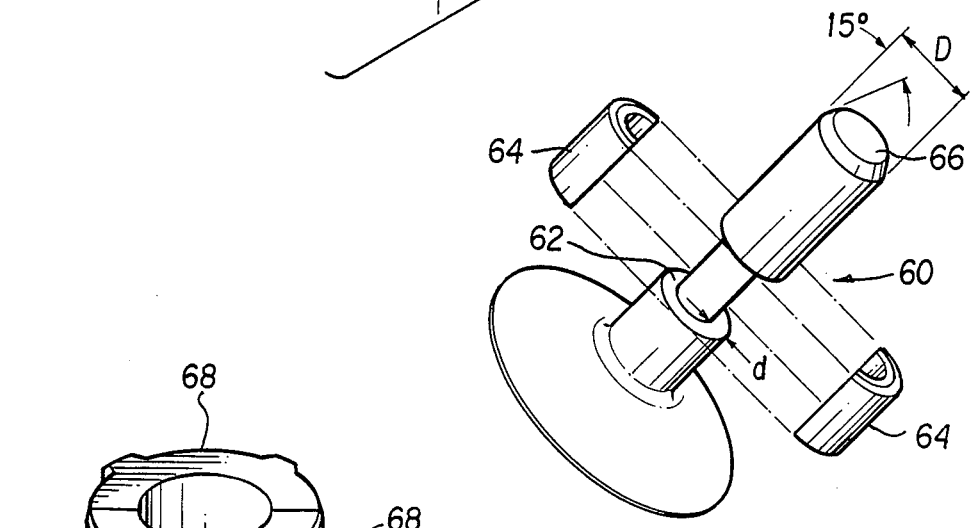
FIG. 5 is an exploded view of a second embodiment of the present invention showing an extension to a flexible polymer and the rigid plastic inserts.

FIG. 5 shows a suction cup with a cylindrical extension 60. The cylindrical extension 60 is provided with a circular channel 62. The circular channel 62 has a depth d into which the inserts 64 slide. The channel depth d should be approximately ¼ the diameter D of the cylindrical extension. The insert 64 when engaged in the channel 62 are contoured such that they will slidably engage a passage. The insert 64 should be positioned with respect to the free end 66 of the cylindrical extension 60 at least a distance equal to the depth d of the channel 62.

Figure 6:
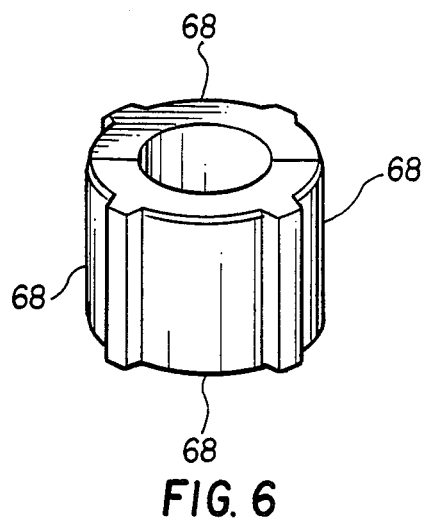
FIG. 6 shows an assembled pair of rigid plastic inserts showing the recesses for passage of fluid.

The inserts 64 of the cylindrical extension 60 have recesses 68 as shown in FIG. 6. These recesses are preferably between about 0.001 inch and 0.010 inch in depth. The recesses provide reservoirs for retaining the solvent or glue during the slidable engaging of the passage as well as venting of gas compressed in the passage during the inserting of the cylindrical extension 60 into the passage. The preferred solvent is a blend of Aliphatic salts and petroleum distillates.

To further facilitate the acceptance of the passage of the inserts the leading edges should be tapered to an angle of about 15 degrees. The inserts are preferably beveled on both ends so that the inserts are symmetrical thus simplifying the assembly process.

While the present invention has been described in terms of preferred embodiments and particular applications substitution to the method by one skilled in the art can be made without departing from the spirit of the invention.

What I claim is:

1. A method for attaching a flexible plastic to a rigid plastic such method comprising the steps of:
    providing a passage in the rigid plastic;
    providing an extension on the flexible plastic component, said extension being contoured to have a surface which slidably engages said passage;
    providing one or more indentations in said surface of said extension;
    placing rigid plastic inserts into said indentations, said rigid plastic inserts being contoured such that when said inserts are placed into said indentations an exposed surface will slideably engage said passage;
    wetting said rigid plastic inserts with a bonding liquid; and
    sliding said extension into said passage.

2. The method of claim 1 wherein said passage and said extension are volumes having a peripheral surface generated by displacement of a line parallel to an axis about said axis, and further wherein said indentations are channels substantially normal to said axis.

3. The method of claim 2 wherein the volume generated in a cylinder.

4. The method of claim 2 further comprising the step of providing recesses on said exposed surface to retain said bonding liquid.

5. The method of claim 4 wherein said inserts and said rigid plastic component have the same composition and said bonding liquid is a solvent for said regid plastic.

6. The method of claim 4 wherein said recesses have a depth of between about 0.001 inch and 0.010 inch.

7. The method of claim 3 wherein said channels have a depth of approximately ¼ said cylinder's diameter.

8. The method of claim 7 wherein said extension has a free end which is displaced by at least the depth of the channel.

9. The method of claim 8 further comprising means for retaining said inserts in said channel.

10. The method of claim 9 wherein said means for retaining are pins and pin receivers.

11. The method of claim 9 wherein said means for retaining is a friction fit between said channel and said inserts.

12. The method of claim 10 wherein said inserts have leading edges which are beveled and said inserts have recesses between about 0.001 and 0.010 each.

13. The method of claim 11 wherein said inserts have leading edges which are beveled and said inserts have recesses between about 0.001 and 0.010 each.

14. The method of claim 12 wherein said insert when positioned in said channel is of such dimensions as to allow for a press fit in said passage upon slideably engaging said extensions into said passage.

15. The method of claim 13 wherein said inserts when positioned in said channel is of such dimensions as to allow for a press fit in said passage upon slideably engaging said extensions into said passage.

* * * * *